United States Patent [19]

Jung et al.

[11] Patent Number: 5,120,690
[45] Date of Patent: Jun. 9, 1992

[54] PROCESS FOR THE UTILIZATION OF USED DENOX CATALYSTS

[75] Inventors: Jürgen Jung, Dorsten; Helmut Kretschmer, Haltern; Rolf Müller, Marl, all of Fed. Rep. of Germany

[73] Assignee: Huels Aktiengesellschaft, Marl, Fed. Rep. of Germany

[21] Appl. No.: 691,253

[22] Filed: Apr. 25, 1991

[30] Foreign Application Priority Data

Apr. 28, 1990 [DE] Fed. Rep. of Germany ....... 4013720

[51] Int. Cl.⁵ ..................... C04B 18/06; C04B 18/30; C04B 20/02
[52] U.S. Cl. .................................... 501/155; 106/439; 106/449
[58] Field of Search ............... 106/405, 439, 449; 501/155

[56] References Cited

U.S. PATENT DOCUMENTS

| | | | |
|---|---|---|---|
| 2,414,734 | 9/1943 | Gelbman | 501/155 X |
| 2,576,565 | 11/1951 | Brown | 501/155 |
| 4,272,293 | 6/1981 | Hooykaas | 501/155 |
| 4,764,216 | 8/1988 | Hooykaas | 501/155 X |
| 4,764,276 | 8/1988 | Berry et al. | 210/264 |
| 4,915,039 | 4/1990 | Ringel | 110/346 |

FOREIGN PATENT DOCUMENTS 2154156 5/1973 Fed. Rep. of Germany .
3830392 3/1990 Fed. Rep. of Germany .

Primary Examiner—William R. Dixon, Jr.
Assistant Examiner—Lisa M. Schull
Attorney, Agent, or Firm—Millen, White & Zelano

[57] ABSTRACT

For a complete utilization of used DeNOx catalysts contaminated with fly ash, the catalyst is crushed to a particle size of usually less than 500 microns, admixed with the ash of a molten ash firing chamber of a coal power plant at weight ratio of usually at least 9 parts molten ash to 1 part catalyst where the catalyst is dissolved in the molten ash at a temperature generally above 1460° C. The resulting molten ash chamber granulated material can be utilized in the usual way, for example in the construction industry, since no pollutants, especially no compounds of tungsten, molybdenum, vanadium and arsenic are eluted into the environment.

18 Claims, No Drawings

PROCESS FOR THE UTILIZATION OF USED DENOX CATALYSTS

BACKGROUND OF THE INVENTION

In the combustion of coal in power plants, nitrogen oxides are formed, which are usually designated by the symbol NOx. These oxides are environmental contaminants and should not be allowed to enter the atmosphere. Therefore, they are largely removed by a process known as nitrogen oxide removal, comprising the reduction of the nitrogen oxide by ammonia as the reducing agent in the presence of a suitable catalyst with the formation of nitrogen. The catalyst, designated as a DeNOx catalyst, generally comprises 50 to 90% by weight of titanium dioxide, 5 to 20% by weight of tungsten trioxide and/or molybdenum trioxide, and 0 to 10% by weight of divanadium pentoxide. Generally, the catalyst has the shape of honeycombs.

There are basically two firing technologies in the combustion of coal: dry firing and molten ash chamber firing. Both firings are generally operated with dustfine ground coal. With dry firing, the combustion temperature is below the fusion temperature of the ash, which results in the fly ash being almost completely entrained by the flue gas stream and separated as fly ash in the electrostatic filter. The fusion temperature of the ash varies with its composition. For example, the fusion temperature of German anthracite coal is about 1400° C.

With molten ash chamber firing, the combustion temperature is above the fusion temperature of the ash, for example, at full load, at about 1500° C. The predominant part of the ash combines into a melt at the bottom of the molten ash chamber. It is conducted into a water bath, where it is quenched. The solidified melt is designated as molten ash chamber granulated material or slag. This material has a low porosity, is glasslike, dark gray to black, and has a particle diameter of less than 15 mm. The slag, comprising primarily aluminum silicate, finds multiple uses in the construction industry. The ash entrained by the flue gas stream is contaminated with arsenic compounds and, after being separated in the electrostatic filter, is dumped as special waste or fed back into the molten ash chamber firing. In the latter case, all the ash from the molten ash chamber firing is obtained as slag which meets environmental requirements and can be utilized in the usual manner. The fly ash from the molten ash chamber firing thus can be utilized without causing a pollution problem.

The DeNOx catalysts used for nitrogen oxide removal, i.e. in the gas firing, oil firing and in case of the combustion of coal in the dry firing and molten ash chamber firing, upon loss of activity, are regenerated or, if this is not possible, are processed for the recovery of the oxides of valuable metals, i.e., of tungsten, molybdenum, and vanadium (DE-OS 35 08 902, EP-OS 0 161 206). The used catalysts are contaminated with fly ash and, in the case of molten ash chamber firing, are contaminated with arsenic compounds. The processes for regeneration and recovery require relatively high chemical and energy consumption, and resultant contaminated residues create a significant waste disposal problem. Even worse, if regeneration and recovery are not possible, the entire untreated, used DeNOx catalysts have to be dumped as waste.

Thus, prior to the present invention, no process was known for the environmentally unobtrusive utilization of used DeNOx catalysts.

SUMMARY OF THE INVENTION

An object of this invention is to provide an improved process for the utilization of used DeNOx catalysts, especially a process which does not exhibit the disadvantages of the processes of the prior art.

Another object is to provide compositions based on the used DeNOx catalysts.

Upon further study of the specification and appended claims, further objects and advantages of this invention will become apparent to those skilled in the art.

To attain these objects, there is provided a process for utilization of used DeNOx catalysts, comprising crushing the used catalysts; admixing resultant crushed catalysts with molten ash obtained from a molten ash chamber firing of a coal power plant in order to melt the catalyst and dissolve it in the molten ash; and quenching resultant mixed melt, preferably in a water bath. The resultant quenched molten ash chamber granulated material is utilized in the same manner as molten ash chamber granulated material having no used catalyst added thereto.

The achievement of this invention is surprising considering the fact that the fusion temperature of the used, dust-fine ground catalyst, contaminated with fly ash, is in the range of about 1650° to 1780° C., i.e., substantially above the combustion temperature of about 1500° C. attainable in a molten ash chamber firing at full load. It is also surprising that the resultant molten ash chamber granulated material used for conventional purposes gives off no pollutants, especially no compounds of tungsten, molybdenum, and vanadium, into the environment and thus meets specifications for use, for example, in the construction industry.

DeNOx catalysts generally have the shape of honeycombs and, for utilization of the used DeNOx catalysts, it is necessary that they be crushed. They are broken in a first crushing stage and are ground in a second crushing stage. The broken catalysts can be ground in a mill outside the power plant or in a coal mill of the power plant. The broken catalysts can be mixed in the coal mill with the coal to be burned and can be ground together with it. The catalysts can be dissolved more easily in the molten ash, the finer they are ground. They are crushed to such an extent that they usually exhibit an average particle diameter of less than 500 microns, preferably less than 200 microns. The dustfine ground catalysts generally are stored in a silo and can be pneumatically conveyed to the molten ash chamber firing as a separate feed or by an existing fly ash return pipe.

Prior to the admixing of the catalyst, a typical analysis of the components of the molten ash from the molten ash chamber is:

| Component (by weight) | Specific | Range |
| --- | --- | --- |
| $SiO_2$ (%) | 47.5 | 40-55 |
| $Al_2O_3$ (%) | 24.1 | 23-35 |
| $Fe_2O_3$ (%) | 7.6 | 4-17 |
| CaO (%) | 3.4 | 1-8 |
| $K_2O$ (%) | 3.1 | 1.5-5.5 |
| $Na_2O$ (%) | 2.3 | 0.1-3.5 |
| MgO (%) | 2.7 | 0.8-4.8 |
| BaO (%) | 0.8 | 0.5-1.3 |
| $TiO_2$ (%) | 0.8 | 0.5-1.3 |
| $WO_3$ (%) | 0.0 | |
| $V_2O_5$ (%) | 0.3 | 0.1-0.5 |

-continued

| Component (by weight) | Specific | Range |
|---|---|---|
| ZnO (%) | 0.1 | 0–0.3 |
| SO₃ (%) | 0.4 | 0.1–2.0 |
| loss on ignition (800° C.) (%) | 0.0 | 0 |

Likewise, a representative analysis of used DeNOx catalyst is:

| Component (by weight) | Specific | Ranges |
|---|---|---|
| loss on ignition | 3.0 | 1–10 |
| TiO₂ (%) | 84.3 | 50–90 |
| WO₃ (%) | 6.7 | 0–12 |
| MoO₃ (%) | 0.3 | 0–12 |
| BaO (%) | 0.05 | 0–5 |
| CaO (%) | 0.7 | 0.2–4 |
| V₂O₅ (%) | 0.7 | 0–10 |
| SO₄ (%) | 4.3 | 1–10 |
| flue ash contaminants (%) | <1 | 0–3 |
| As (%) | 0.02 | 0–1 |

The combustion temperature in the molten ash chamber firing has to be sufficiently high to melt the catalyst. Generally, the catalysts are admixed with the molten ash of a molten ash chamber firing at more than 1460° C., preferably more than 1470° C., and melted and thus dissolved in the molten ash.

At any given temperature, the weight ratio of ash/catalyst has to be sufficiently high to form a homogeneous or substantially homogeneous product. Generally, it is larger than or equal to 9:1, preferably larger than or equal to 12:1. In this case, it is to be recognized that the lower the weight ratio, the higher the combustion temperature required in the molten ash chamber firing.

Following the above parameters for guidance, it is possible without any difficulty to melt and thus dissolve the catalysts homogeneously or substantially homogeneously in the melt, so as to produce a homogeneous or substantially homogeneous molten ash chamber granulated material. A few simple tests (see examples) are sufficient to hone in on the desired results. In each case, the molten ash chamber granulated material is examined by x-ray spectroscopy and evaluated.

The following table lists, for purposes of illustration, an analysis of important components from a pollution standpoint, e.g., metals (except for Si) and sulfate, of resultant granulated material based on 25 parts by weight of molten ash and 1 part by weight of used catalyst:

| | |
|---|---|
| Al (wt. %) | 13–15 |
| K (wt. %) | 2–4 |
| Na (wt. %) | 1–3 |
| Ti (wt. %) | 2.5–5 |
| W (mg/kg) | 2000–2800 |
| V (mg/kg) | 100–1000 |
| Mo (mg/kg) | 100–3000 |
| As (mg/kg) | <5–10 |
| SO₄ (mg/kg) | 50–100 |

The molten ash chamber granulated material obtained according to the process of the invention is suitable for multiple uses in the construction industry, for example, street and road construction, for construction of horizontal drainage blankets, for drainage backfill and as aggregate in the production of concrete. It is also suitable as abrasive and as winter abrasives. The particle size range of the granulated product is from less than 1 to about 15 mm.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above and below, and of corresponding application Federal Republic of Germany P 40 13 720.1, filed Apr. 28, 1990, published on or before Oct. 31, 1991, are hereby incorporated by reference.

EXAMPLES

Example 1

18 parts of a dust-fine ground molten ash chamber granulated material was thoroughly mixed with 1 part of a dust-fine ground used DeNOx catalyst. Two specimens of the mixture were heated for 20 or 22 minutes to 1460° C. or 1480° C. Thus in each case a melt was obtained. The cooled specimens were examined by x-ray spectroscopy to evaluate the melt properties.

With respect to the specimen treated at 1460° C. about three-fourths of the surface was covered with particles. This specimen can be designated as nonhomogeneous.

With respect to the specimen treated at 1480° C., no particles could be detected on the surface. This specimen can be designated as homogeneous.

Example 2

8 or 9 parts of a dust-fine ground molten ash chamber granulated material was thoroughly mixed with 1 part of a dust-fine ground used DeNOx catalyst. Specimens of the two mixtures were heated for 25 minutes to 1500° C. Thus, in each case a melt was obtained. The cooled specimens were examined by x-ray spectroscopy to evaluate the melt properties.

With respect to the first specimen, based on 8 parts, the surface was dull and rough and exhibited greenish yellow discolorations. This specimen can be designated as nonhomogeneous.

With respect to the second specimen, based on 9 parts, the surface was smooth and shiny and brown in color and not different from the surface of the molten ash chamber granulated material by itself. This specimen can be designated as homogeneous.

A homogeneous melt, obtained as in example 1 at 1480° C., and obtained as in example 2 from a molten ash chamber granulated material/catalyst in a weight ratio of 9:1, were quenched in water. The obtained granulated materials and the unmodified molten ash chamber granulated material were examined in regard to elutability of the pollutants (DIN 38 414, part 4, Oct. 1984, German Standard Method for Water, Sewage and Sludge Analysis, Sludge and Sediments, Group S, Determination of the Elutability with Water, page 4). No significant differences were detected.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the utilization of used DeNOx catalyst, comprising crushing the catalyst, admixing resultant catalyst particles with molten ash from a molten ash firing chamber of a coal power plant at a sufficiently high temperature and at a sufficiently high ratio of said molten ash to resultant crushed catalyst particles so as to dissolve the catalyst in the molten ash and quenching resultant mixture.

2. A process according to claim 1, wherein the catalyst particles are admixed and dissolved at more than 1460° C.

3. A process according to claim 1, wherein the catalyst particles are admixed and dissolved at more than 1470° C.

4. A process according to claim 1, wherein the catalyst particles are admixed in a weight ratio of ash/catalyst of at least 9:1.

5. A process according to claim 2, wherein the catalyst particles are admixed in a weight ratio of ash/catalyst of at least 9:1.

6. A process according to claim 3, wherein the catalyst particles are admixed in a weight ratio of ash/catalyst of at least 9:1.

7. A process according to claim 2, wherein the catalyst particles are admixed in a weight ratio of ash/catalyst of at least 12:1.

8. A process according to claim 3, wherein the catalyst particles are admixed in a weight ratio of ash/catalyst of at least 12:1.

9. A process according to claim 1, wherein the catalyst is crushed to an average particle diameter of less than 500 microns.

10. A process according to claim 1, wherein the catalyst is crushed to an average particle diameter of less than 200 microns.

11. A process according to claim 8, wherein the catalyst is crushed to an average particle diameter of less than 200 microns.

12. A process according to claim 1, wherein the catalyst particles are homogeneously dissolved in the molten ash.

13. A process according to claim 11, wherein the catalyst particles are homogeneously dissolved in the molten ash.

14. A process according to claim 1, wherein the used catalyst has the following composition in percent by weight:

| Component (by weight) | Range |
| --- | --- |
| loss on ignition (%) | 1–10 |
| $TiO_2$ (%) | 50–90 |
| $WO_3$ (%) | 0–12 |
| $MoO_3$ | 0–12 |
| BaO (%) | 0–5 |
| CaO (%) | 0.2–4 |
| $V_2O_5$ (%) | 0–10 |
| $SO_4$ (%) | 1–10 |
| flue ash contaminants | 0–3 |
| As (%) | 0–1 |

15. A process according to claim 14, wherein the molten ash has the following composition in percent by weight

| Component (by weight) | Range |
| --- | --- |
| $SiO_2$ (%) | 40–55 |
| $Al_2O_3$ (%) | 23–35 |
| $Fe_2O_3$ (%) | 4–17 |
| CaO (%) | 1–8 |
| $K_2O$ (%) | 1.5–5.5 |
| $Na_2O$ (%) | 0.1–3.5 |
| MgO (%) | 0.8–4.8 |
| BaO (%) | 05.–1.3 |
| $TiO_2$ (%) | 0.5–1.3 |
| $V_2O_5$ (%) | 0.1–0.5 |
| ZnO (%) | 0–0.3 |
| $SO_3$ (%) | 0.1–2.0 |
| loss on ignition (800° C.) (%) | 0 |

16. A granulate composed of a homogeneous mixture of (a) ash from a molten ash chamber from a coal fired power plant and (b) used DeNOx catalyst.

17. A granulate according to claim 16, wherein said ash has the following composition:

| Component (by weight) | Range |
| --- | --- |
| $SiO_2$ (%) | 40–55 |
| $Al_2O_3$ (%) | 23–35 |
| $Fe_2O_3$ (%) | 4–17 |
| CaO (%) | 1–8 |
| $K_2O$ (%) | 1.5–5.5 |
| $Na_2O$ (%) | 0.1–3.5 |
| MgO (%) | 0.8–4.8 |
| BaO (%) | 05.–1.3 |
| $TiO_2$ (%) | 0.5–1.3 |
| $V_2O_5$ (%) | 0.1–0.5 |
| ZnO (%) | 0–0.3 |
| $SO_3$ (%) | 0.1–2.0 |
| loss on ignition (800° C.) (%) | 0 | and said catalyst has the following composition

| | |
| --- | --- |
| loss on ignition (%) | 1–10 |
| $TiO_2$ (%) | 50–90 |
| $WO_3$ (%) | 0–12 |
| $MoO_3$ (%) | 0–12 |
| BaO (%) | 0–5 |
| CaO (%) | 0.2–4 |
| $V_2O_5$ (%) | 0–10 |
| $SO_4$ (%) | 1–10 |
| flue ash contaminants | 0–3 |
| As (%) | 0–1 |

18. A granulate according to claim 17, wherein the weight ratio of (a) to (b) is at least 9:1, and compounds therein of tungsten, molybdenum, vanadium and arsenic are not susceptible to elution.

* * * * *